Jan. 3, 1933.    H. GRIEBAT    1,892,945
TRACTOR LUG
Filed March 14, 1932
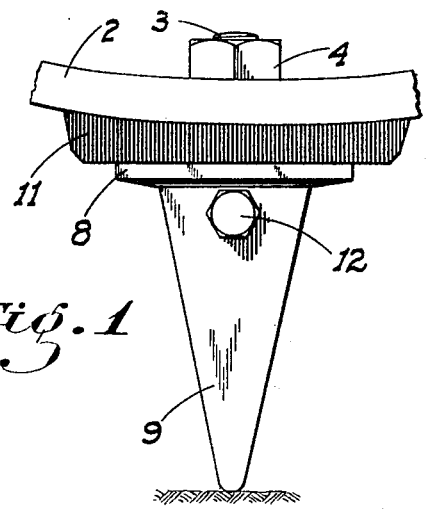
Fig.1
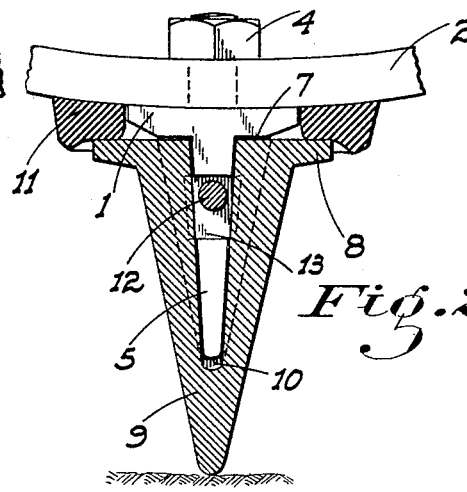
Fig.2
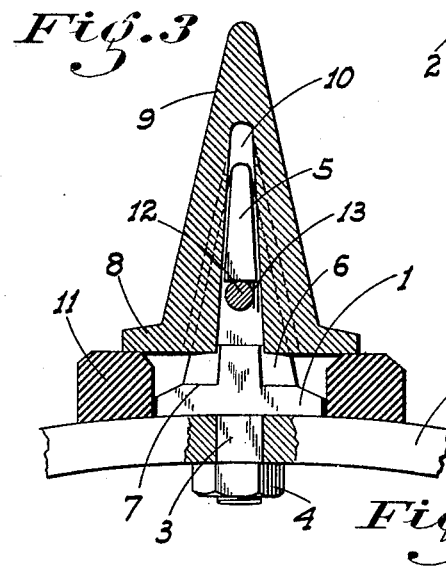
Fig.3
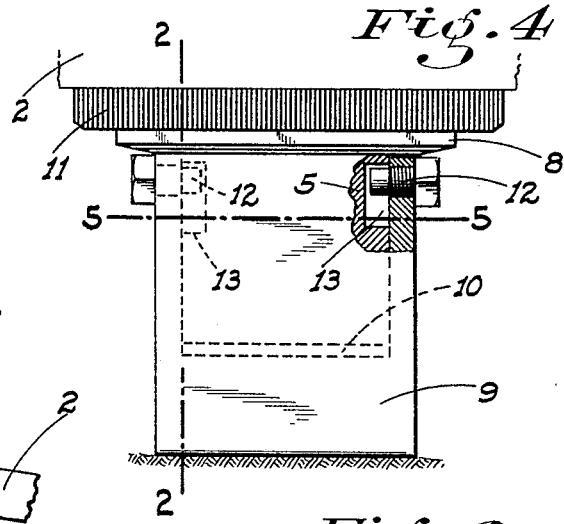
Fig.4
Fig.5
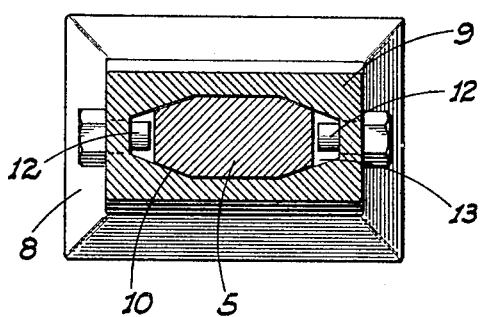
Fig.6
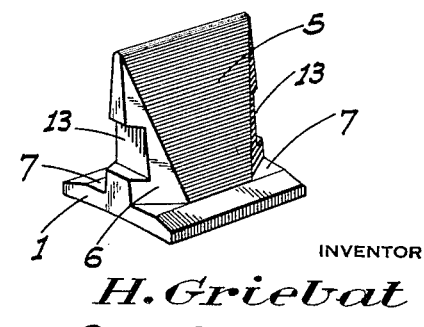
INVENTOR
H. Griebat
BY
ATTORNEY Patented Jan. 3, 1933

1,892,945

UNITED STATES PATENT OFFICE

HERMAN GRIEBAT, OF LODI, CALIFORNIA

TRACTOR LUG

Application filed March 14, 1932. Serial No. 598,596.

This invention relates to tractors' lugs or carriers such as are applied to round wheel tractors in order to increase their traction.

The principal object of my invention is to provide a lug of this general character so constructed that each time it pulls out of the ground it will shake off and clear itself of any dirt tending to adhere in the angle between the wheel rim and the lug, so that my improved lug may truly be defined as being self-cleaning.

A further object is to construct the lug so that when traveling over hard ground it provides a cushioning effect on the tractor, thus reducing shocks and vibrations otherwise imparted to the tractor and promoting the comfort of the operator in giving easier or softer riding qualities to the tractor.

A further object of the invention is to produce a simple and inexpensive device and yet one which will be exceedingly effective for the purpose for which it is designed.

The objects I accomplish by means of such structure and relative arrangement of parts as will fully appear by a perusal of the following specification and claims.

In the drawing similar characters of reference indicate corresponding parts in the several views:

Fig. 1 is a side view of my improved lug as mounted on a wheel and as supporting the weight of the tractor.

Fig. 2 is a similar view with the near side of the sheath removed as on the line 2—2 of Fig. 4.

Fig. 3 is a view similar to Fig. 2 with the lug relieved of its load.

Fig. 4 is a front view of the lug partly broken away and with the load on the lug.

Fig. 5 is a sectional plan taken on the line 5—5 of Fig. 4.

Fig. 6 is a perspective view of the inner body or core of the lug.

Referring now more particularly to the characters of reference on the drawing, the inner member or fixed core of the lug comprises a base 1 of rectangular form and curved on one face to follow the curvature of the rim 2 of the tractor wheel on which said base rests. A bolt 3 depends centrally from the curved face of the base, said bolt projecting through a hole in the rim and being secured to the rim by a nut 4. The portion of the bolt engaging the rim is non-circular, as is the hole, so that the bolt and base cannot turn.

Projecting from the opposite face of the base is the body 5 of the core, the side edges of the body being parallel to each other and flush with the sides of the base. The opposite faces however preferably have an inception some distance from the corresponding edges of the base and extend in converging relation to each other so that the body is of wedge-like form and is correspondingly very strong in the direction from which the strains come without being excessively heavy. At the sides of the body the converging surfaces thereof are cut away diagonally from the base upwardly to the top, as shown at 6 so as to leave flat ledges 7 at the base on the opposite sides and corners of the body.

Slidably mounted on the core is the outer member or sheath of the lug comprising a base 8 larger than the base 1 and a portion 9 enveloping the body 5. The hollow interior area 10 of the sheath extends unbroken from the outer face of the base 8 and is shaped to follow the contour of the body and cut away portions 6 so that the base 8 may be supported on the ledges 7 of the core. The size of the area 10 relative to that of the core body is such that when the sheath thus rests on the ledges the adjacent walls of the core and sheath are still clear of each other slightly, as indicated in Fig. 5 so that there is no tendency for the separate parts to bind and wedge each other.

In normal operation however the base 8 never engages said ledges since the base rides on a compressible pad 11 of suitable material which rests on the rim 2 in surrounding relation to the base 1 and which in its normal uncompressed condition is considerably thicker than said base, as shown in Fig. 3.

The sheath is prevented from dropping off the core when inverted by pins in the form of cap screws 12 mounted in the sides of the sheath and whose inner ends project into notches 13 cut in the sides of the core lengthwise thereof or radially of the wheel. The length of the notches is sufficient to permit of the necessary radial movement of the sheath from the uncompressed position of the pad to a position at which the pad is fully compressed and the sheath base rests on the ledges.

In operation it will be seen that as long as the sheath clears the ground it is held outwardly relative to the core by the expanding pressure of the pad. When the sheath engages the ground the pad is compressed and the shocks and jars otherwise imparted to the wheel and tractor by the sudden contact of the lug with hard ground is absorbed by the cushion pad. When the lug again draws out of the ground the pad expands, pushing the sheath outwardly and breaking loose any dirt which may have been lodged between the lug and the rim of the wheel. The base of the sheath is always engaged with the pad, which extends all about the base so that no dirt can enter between the parts and cause a clogging or wedging action. Any time it is necessary to replace a pad in the event that it has deteriorated this may be done either by removing the lug in toto by taking off the nut 4, or by removing the pins 12 so as to withdraw the sheath alone. Either operation of course will expose the pad for removal.

It is to be noted that the pins 12 engage the corresponding ends of the notches before a fully uncompressed condition of the pad is reached, so that the remaining pressure of the pad not only prevents rattling of the sheath on the core, but holds the base 8 in constant and close engagement with the pad. I also preferably bevel off the fore and aft edges of the pad about the central opening as shown, so as to prevent said edges, when the pad is being compressed, from possibly squeezing in between the core and sheath and causing the latter to jam.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A tractor lug including a core member to project radially from the tread face of a wheel, means to rigidly secure the core on the wheel, a ground engaging sheath slidably mounted on and covering the core, means to limit radially outward sliding movement of the sheath, and a resilient cushion element supported on said wheel face and disposed between the base of the sheath and the wheel to normally hold the sheath outwardly of the wheel.

2. A tractor lug including a core member to project radially from the tread face of a wheel, means to rigidly secure the core on the wheel, a ground engaging sheath slidably mounted on and covering the core, means to limit radially outward sliding movement of the sheath, and a continuous resilient pad supported on said wheel face and surrounding the base of the core; the base of the sheath resting throughout its peripheral extent on said pad.

3. A device as in claim 1, with shoulders formed on the core adjacent its base to engage the base of the sheath after the pad has been compressed a predetermined amount.

4. A tractor lug including a core member to project radially from the tread face of a wheel, means to rigidly secure the core on the wheel, a ground engaging sheath slidably mounted on and covering the core, the latter having a longitudinal slot intermediate its ends permanently covered by the sheath, a pin mounted in the sheath and engaging the slot, and a resilient element disposed between the base of the sheath and the wheel to normally hold the sheath outwardly of the wheel.

In testimony whereof I affix my signature.
HERMAN GRIEBAT.